United States Patent [19]

Taddia et al.

[11] Patent Number: 5,316,122
[45] Date of Patent: May 31, 1994

[54] STORAGE UNIT FOR ELONGATED ELEMENTS, PARTICULARLY CIGARETTES

[75] Inventors: Giuseppe Taddia, Lovoleto Di Granarolo Emilia; Armando Neri, Bologna, both of Italy

[73] Assignee: G. D Societa' Per Azioni, Bologna, Italy

[21] Appl. No.: 94,847

[22] Filed: Jul. 20, 1993

[30] Foreign Application Priority Data

Jul. 28, 1992 [IT] Italy .................. BO92A 000291

[51] Int. Cl.⁵ .................................. B65G 1/00
[52] U.S. Cl. .................................... 198/347.3
[58] Field of Search ............... 198/347.1, 347.2, 347.3, 198/778

[56] References Cited

U.S. PATENT DOCUMENTS

| | | | |
|---|---|---|---|
| 3,869,115 | 3/1975 | Barkley | 198/347.3 X |
| 4,254,858 | 3/1981 | Seragnoli | 198/347.3 |
| 4,344,445 | 8/1982 | Seragnoli | 198/347.3 X |
| 4,795,020 | 1/1989 | Carter et al. | 198/347.3 X |
| 4,872,543 | 10/1989 | Hinchcliffe | 198/347.3 |

*Primary Examiner*—James R. Bidwell
*Attorney, Agent, or Firm*—Marshall, O'Toole, Gerstein, Murray & Borun

[57] ABSTRACT

A storage unit for elongated elements, particularly cigarettes, wherein a mass of cigarettes is supported on a first conveyor movable both ways through a loading-unloading station where the first conveyor is connected to a second conveyor by a connecting plate. A transversely articulated slide longer than the connecting plate travels together with the first conveyor, and, when unloading, is pushed by an end contact member on the first conveyor into engagement with the second conveyor, and travels together with the second conveyor so as to fully unload the storage unit.

6 Claims, 2 Drawing Sheets

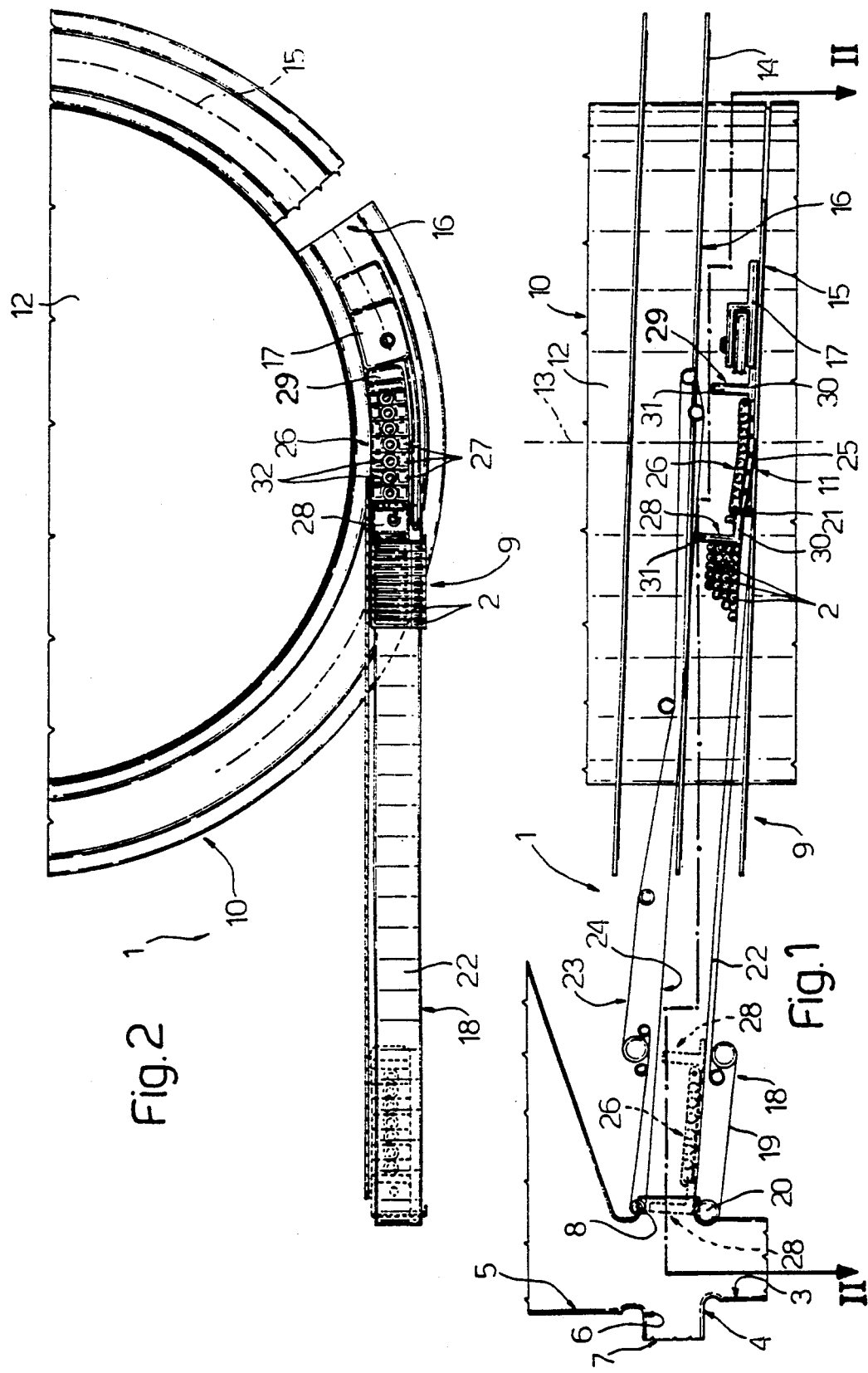

STORAGE UNIT FOR ELONGATED ELEMENTS, PARTICULARLY CIGARETTES

BACKGROUND OF THE INVENTION

The present invention relates to a storage unit for elongated elements, particularly cigarettes.

In the following description, specific reference is made, purely by way of example, to a storage unit of the type described in U.S. Pat. No. 4,254,858, to which full reference is made herein in the interest of full disclosure, and which is installed between cigarette manufacturing and packing machines for compensating for any difference in the output of the machines.

The above prior patent relates to a storage unit comprising an elastic wall moving both ways along a helical path, for feeding a mass of cigarettes to and from a loading-unloading station defined by a conveyor and a connecting plate connecting the conveyor to the elastic wall.

When unloading, the mass of cigarettes is fed to the conveyor by a contact plate on one end of the helical wall, and which, after unloading, is arrested substantially contacting the opposite end of the connecting plate to that contacting the conveyor.

At the end of the unloading stage, therefore, all the cigarettes reaching the conveyor are unloaded, while all those still on the connecting plate are left in place. In other words, on the known storage unit described above, a given quantity of cigarettes exists which, once loaded, can no longer be unloaded except manually by the operator.

SUMMARY OF THE INVENTION

It is an object of the present invention to provide a storage unit designed to overcome the aforementioned drawback.

According to the present invention, there is provided a storage unit for elongated elements, particularly cigarettes, the unit comprising a variable-capacity store; a store loading-unloading station; and a first reversible loading-unloading conveyor moving to and from said station along a first path; said unit comprising a second reversible conveyor for a number of said elements, the second conveyor moving along a second path extending through said station; and fixed bridging means interposed between said conveyors at said station; characterized by the fact that it also comprises a slide moving along said first and second paths and comprising contact means for containing and pushing said elements along said paths; the length of the slide being greater than that of said bridging means.

BRIEF DESCRIPTION OF THE DRAWINGS

A non-limiting embodiment of the present invention will be described by way of example with reference to the accompanying drawings, in which:

FIG. 1 shows a partial side view of a preferred embodiment of the storage unit according to the present invention and as applied to a user machine;

FIG. 2 shows a section along line II—II in FIG. 1;

DETAILED DESCRIPTION OF THE INVENTION

Figure 3:
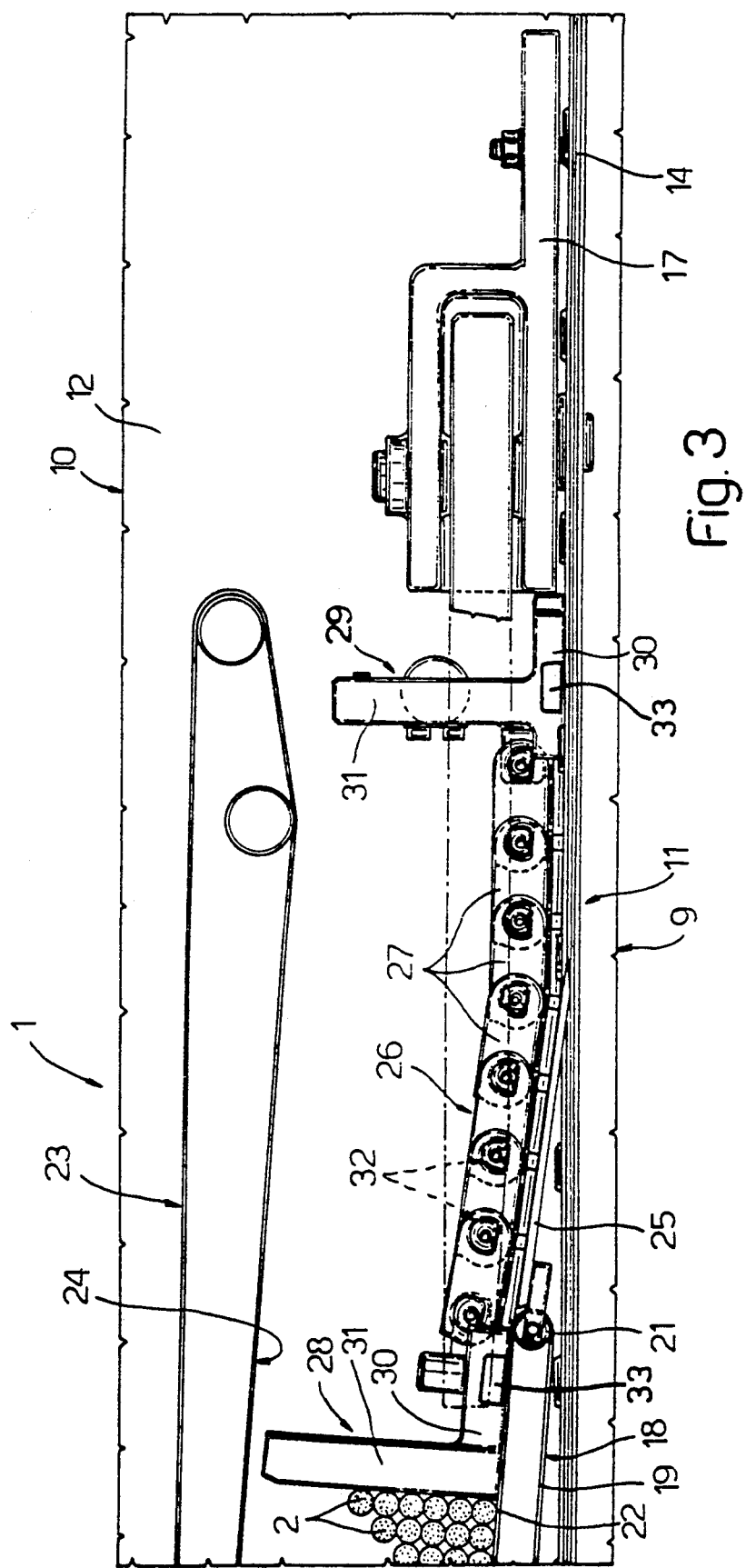
FIG. 3 shows a larger-scale detail of FIG. 1.

Number 1 in the accompanying drawings indicates a conveyor assembly for transferring cigarettes 2 from one or more cigarette manufacturing machines (not shown) to a packing machine (not shown). Assembly 1 comprises a dropdown channel 3 connected at the bottom to the input of the feedbox (not shown) of a packing machine (not shown), and extending downwards from an intersection 4 to which cigarettes 2 are supplied in bulk by a top channel 5 at the output of the manufacturing machine/s (not shown). Intersection 4 communicates, via a first opening 6, with a known type of micro compensating store 7, and, via a second opening 8 facing opening 6, with a storage unit 9 acting as an intermediate store between the manufacturing machine/s (not shown) and the packing machine (not shown). As shown in FIGS. 1 and 2, unit 9, a more detailed description of which is to be found in U.S. Pat. No. 4,254,858, comprises a variable-capacity store 10 with a station 11 for loading/unloading store 10. Store 10 comprises a fixed cylindrical supporting body 12 with a substantially vertical axis 13; and a conveyor belt 14 moving about body 12 along a helical path 15 extending through station 11, and connected to body 12 in sliding manner so as to define a helical duct 16 of variable length for receiving a number of cigarettes 2 arranged radially in relation to body 12. Belt 14 is fitted integral with an end contact bracket 17, and is moved, in relation to body 12 and by known reversible actuating means (not shown), between a first limit position corresponding to zero capacity of store 10 (FIG. 1) and wherein bracket 17 is positioned close to station 11 and on the opposite side of station 11 to dropdown channel 3; and a second limit position (not shown) corresponding to maximum capacity of store 10. unit 9 also comprises a conveyor 18, the belt 19 of which, looped about pulleys 20 and 21, presents a top branch 22, which, at the end looped about pulley 21, is substantially tangent to the surface of belt 14, and defines, with the bottom branch of an endless conveyor belt 23, a duct 24 connecting intersection 4 to duct 16 and sloping more steeply than duct 16. At station 11, branch 22 is connected to belt 14 by a fixed bridging plate 25 between ducts 16 and 24.

As shown, particularly in FIG. 3, unit 9 also comprises an articulated slide 26 interposed between bracket 17 and cigarettes 2, and which slides inside ducts 16 and 24 with belts 14 and 19, and through station 11 in contact with plate 25. When viewed from above and undeformed, slide 26 is shaped in the form of an elongated rectangle, and comprises a succession of substantially rectangular, transverse plates 27, and a pair of end brackets 28 and 29. Each bracket 28, 29 presents a substantially L-shaped cross section, and comprises a first flat bottom wall 30 aligned with plates 27 and positively engaging belts 14 and 19 by friction, and a second wall 31 extending upwards and integral with and perpendicular to respective wall 30. Wall 31 of bracket 28 is so sized as to engage ducts 16 and 24 in sliding and piston-like manner, and constitutes a supporting and push plate for cigarettes 2 traveling along ducts 16 and 24; while wall 30 of bracket 29 provides for supporting slide 26 on bracket 17 as slide 26 travels along duct 16. As shown in FIG. 3, each plate 27 is connected to the adjacent plate 27 or to adjacent bracket 28, 29 by means of a spherical joint 32 cooperating with the other joints 32 for enabling slide 26 to curve in the plane of plates 27 as well as in the plane perpendicular to plates 27.

The number of plates 27 and the transverse dimensions of brackets 28 and 29 are so selected that slide 26 is longer than plate 25, and so that, when slide 26 is positioned at least partially overlapping plate 25, one of walls 30 positively engages one of belts 14 and 19 by friction.

To ensure such engagement, provision is made for permanent magnets 33 fitted to walls 30 and facing belts 14 and 19; and further permanent magnets (not shown) ensure slide 26 adheres to the lateral walls of store 10 and conveyor 18.

Operation of unit 9 will now be described as of the condition in which a number of cigarettes 2 are housed inside store 10, and assuming store 10 is to be fully unloaded.

As of the above condition, when belt 14 is so moved as to shift bracket 17 towards station 11, cigarettes 2 inside duct 16 are fed forward, and slide 26 moves gradually, together with belt 14, towards station 11. On reaching station 11, slide 26 gradually abandons belt 14 and is moved gradually along plate 25 by bracket 17 integral with belt 14. Gradual engagement of plate 25 by slide 26 is permitted by virtue of joints 32, which enable slide 26 to vary its curvature both in a plane perpendicular to axis 13 and substantially parallel to plate 25, and in a plane substantially parallel to axis 13 and plate 25. By virtue of slide 26 being longer than plate 25, upon belt 14 reaching the limit position wherein the store is empty, wall 30 of bracket 28 moves on to top branch 22 of belt 19, branch 22 draws slide 26 forward by friction, and slide 26, still varying its curvature gradually, abandons first belt 14 and then plate 25, and continues forward together with branch 22 so as to feed cigarettes 2 towards intersection 4.

By virtue of its shape and length, slide 26 thus provides for fully unloading store 10 and duct 24 despite the presence of fixed plate 25.

We claim:

1. A storage unit (9) for elongated elements (2), particularly cigarettes, the unit comprising a variable-capacity store (10) ; a store loading-unloading station (11) ; and a first reversible loading-unloading conveyor (14) moving to and from said station (11) along a first path (16); said unit (9) comprising a second reversible conveyor (18) for a number of said elements (2), the second conveyor (18) moving along a second path (24) extending through said station (11); and fixed bridging means (25) interposed between said conveyors (14, 18) at said station (11); characterized by the fact that it also comprises a slide (26) moving along said first and second paths (16, 24) and comprising contact means (31) for containing and pushing said elements (2) along said paths (16, 24) ; the length of the slide (26) being greater than that of said bridging means (25).

2. A unit as claimed in claim 1, characterized by the fact that said bridging means comprise a fixed connecting plate (25) between said first and second paths (16, 24).

3. A unit as claimed in claim 1, characterized by the fact that said first and second paths (16, 24) slope differently; the slide (26) being articulated at least in a plane parallel to the traveling direction of the slide (26) along said bridging means (25) and substantially perpendicular to the bridging means (25).

4. A unit as claimed in claim 1,
characterized by the fact that said first and second paths (16, 24) curve differently about an axis substantially perpendicular to said bridging means (25) ; the slide (26) being articulated at least in a plane parallel to said bridging means (25).

5. A unit as claimed in claim 1,
characterized by the fact that said slide (26) is elongated in the traveling direction of the slide (26) along said paths (16, 24), and comprises a number of transverse elements (27, 28, 29) mutually aligned in said traveling direction; each transverse element (27, 28, 29) being connected to each adjacent transverse element by means of a spherical joint (32).

6. A unit as claimed in claim 1,
characterized by the fact that it comprises further contact means (17) on said first conveyor (14), for containing and pushing the slide (26) along said first path (16).

* * * * *